(12) United States Patent
Stephenson

(10) Patent No.: US 7,744,845 B2
(45) Date of Patent: Jun. 29, 2010

(54) SYNTHESIS OF LITHIUM ZIRCONATE

(75) Inventor: Hazel Stephenson, Manchester (GB)

(73) Assignee: Magnesium Elektron Limited, Manchester (GB)

( * ) Notice: Subject to any disclaimer, the term of this patent is extended or adjusted under 35 U.S.C. 154(b) by 0 days.

(21) Appl. No.: 12/064,274

(22) PCT Filed: Aug. 25, 2006

(86) PCT No.: PCT/GB2006/003178

§ 371 (c)(1),
(2), (4) Date: Apr. 22, 2008

(87) PCT Pub. No.: WO2007/023294

PCT Pub. Date: Mar. 1, 2007

(65) Prior Publication Data

US 2008/0226542 A1  Sep. 18, 2008

(30) Foreign Application Priority Data

Aug. 25, 2005 (GB) .................................... 0517342

(51) Int. Cl.
*C01G 25/02* (2006.01)
*C01G 25/00* (2006.01)
*C04B 35/622* (2006.01)
*C04B 35/486* (2006.01)

(52) U.S. Cl. .................... 423/594.12; 423/71; 423/608; 423/641

(58) Field of Classification Search ............... 502/80, 502/84, 308, 349; 423/594.12, 71, 608, 641; *B01J 21/06*; *H01M 004/58, 010/24, 010/40*
See application file for complete search history.

(56) References Cited

U.S. PATENT DOCUMENTS

| 5,846,505 A | * | 12/1998 | Saegusa ...................... 423/263 |
| 5,866,090 A | | 2/1999 | Nakagawa et al. |
| 6,024,774 A | | 2/2000 | Nakagawa et al. |

FOREIGN PATENT DOCUMENTS

| EP | 0 333 041 | 3/1989 |
| EP | 1 145 755 | 10/2001 |
| JP | 10-249152 | 9/1998 |
| JP | 2000-348675 | 12/2000 |
| JP | 2001-252557 | 9/2001 |
| WO | 03/030283 | 10/2002 |

OTHER PUBLICATIONS

Lin et al., Published Apr. 21, 2003 "Synthesis and CO2 sorption properties of pure and modified lithium zirconate" Separation and Purification Technology vol. 36, pp. 41-51.*

(Continued)

*Primary Examiner*—Roy King
*Assistant Examiner*—Alexander Polyansky
(74) *Attorney, Agent, or Firm*—Pearne & Gordon LLP

(57) ABSTRACT

A process is disclosed for the preparation of lithium zirconate and doped lithium zirconates for use as regenerable carbon dioxide sorbants by wet mixing zirconium hydroxide with lithium carbonate and then calcining the mixture. Due to the improved physical properties resulting from the disclosed preparation process, the lithium zirconates produced by this process are capable of absorbing carbon dioxide at high rates and in large amounts.

12 Claims, 3 Drawing Sheets

OTHER PUBLICATIONS

Towata et al., Available Dec. 3, 2007 "Synthesis of europium-doped yttrium hydroxide and yttrium oxide nanosheets" vol. 43, No. 4 pp. 1214-1219.*

Shakhashiri, "Chemical of the Week, Ethanol." General Chemistry www.scifun.org.*

Balagopal N. Nair et al., "Processing of lithium zirconate for applications in carbon dioxide separation: structure and properties of the powders," J. Am. Ceram. Soc., 87 (1) 68-74 (2004).

Rentian Xiong et al., "Kinetics of carbon dioxide sorption on potassium-doped lithium zirconate," Chemical Engineering Science 58 (2003) 4377-4385.

Jun-ichi Ida et al., "Synthesis and CO2 sorption properties of pure and modified lithium zirconate," Separation and Purification Technology 36 (2004) 41-51.

Esther Ochoa-Fernandez et al., "Nanocrystalline lithium zirconate with improved kinetics for high-temperature CO2 capture," Chem. Mater. 18 (2006) 1383-1385.

UK Patent Search dated Jul. 17, 2006 (GB0517342.2).

UK Patent Search dated Apr. 26, 2006 (GB0517342.2).

* cited by examiner

SYNTHESIS OF LITHIUM ZIRCONATE

This application claims the benefit of International Application Number PCT/GB2006/003178, which was published in English on Mar. 1, 2007.

This invention relates to an improved process for the production of lithium zirconates.

The use of lithium zirconate for gas purification, specifically carbon dioxide removal and/or collection, is known.

The reaction of lithium zirconate with carbon dioxide is a chemical rather than simply an adsorption reaction and is therefore highly specific for carbon dioxide. This specificity is of particular benefit when there are other gases present in a gas stream that do not need to be removed, such as nitrogen. The reaction of lithium zirconate with carbon dioxide is shown below:

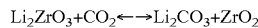

$$Li_2ZrO_3 + CO_2 \leftrightarrow Li_2CO_3 + ZrO_2$$

1 mole of lithium zirconate removes from the gaseous phase 1 mole of carbon dioxide. This equates to over 400 times its own volume of carbon dioxide, giving an increase in volume of the lithium zirconate of about 34%. Since the reaction is reversible the lithium zirconate can be regenerated under appropriate conditions. This property is particularly useful in applications where carbon dioxide needs to be collected and later released in a controlled manner. Lithium zirconate may be regenerated by heating to elevated temperatures, typically in excess of 600° C.

It is known that the kinetics of the carbon dioxide uptake of lithium zirconate and the carbon dioxide capacity of lithium zirconate may be altered by modifying the material. One such modification is the addition of potassium and/or excess lithium to increase the rate of carbon dioxide uptake. However, this has only previously been shown to start to be effective at temperatures in excess of 400° C. Modification of the particle size and crystalline structure/size of lithium zirconate has also been claimed to affect carbon dioxide uptake, but there are conflicting opinions in the prior art as to which form of modification provides the most benefit.

A variety of processes for the preparation of lithium zirconate have been proposed, most involving the use of zirconia as the starting material.

A solid-state method for the production of lithium zirconate is described in a paper by Jerry Y. S. Lin and Jun-ichi Ida entitled "Novel ceramic membrane for high temperature carbon dioxide separation, technical progress report Sep. 1, 2000 to Feb. 28, 2001" (University of Cincinnati, Department of Chemical Engineering, DE-FG26-00NT40824). In this method the zirconia is mixed with lithium carbonate and then the mixture is calcined.

U.S. Pat. No. 6,271,172 in the name of Ohashi et al also uses the mixing of zirconia and lithium carbonate powders.

The preparation method used in the paper "Synthesis and $CO_2$ sorption properties of pure and modified lithium zirconate" by Jun-ichi Ida, Rentian Xiong and Y. S. Lin (Separation and Purification Technology, 36, 2004, 41-51) involves the mixing of zirconia and the relevant carbonates followed by calcination at 500° C. to 1400° C. for 12 hours.

Two papers by K. Nakagawa and T. Ohashi, one called "A novel method of $CO_2$ capture from high temperature gases" (J. Electrochem. Soc. Vol. 145, PP1344 April 1998) and the other entitled "A reversible change between lithium zirconate and zirconia in molten carbonate" (Electrochemistry, Feb. 25, 1999, Vol. 67, PP618), both use the heat treatment of zirconia powder and lithium carbonate to produce lithium zirconate.

In a paper by Jun-ichi Ida and Y. S. Lin entitled "Mechanism of high-temperature $CO_2$ sorption on lithium zirconate" (Lin. Environ. Sci. Technol. 2003, 37, 1999-2004) lithium zirconate is produced by the mixing of zirconia and lithium carbonate in organic solvents.

An alternative method is shown in UK patent No. 2227740 in the name of Flipot and Brauns. Lithium zirconate is synthesised by mixing a lithium compound, such as the peroxide, with zirconia using excess lithium. The mixture is then sintered at 900° C. resulting in a product having a density 95% of theoretical.

A paper entitled "Processing of lithium zirconate for applications in carbon dioxide separation: structure and properties of the powders" (J. Am. Ceram. Soc., 87[1] 68-74 (2004) Balagopal N. Nair, Takeo Yamaguchi, Hiroto Kawamura, and Shin-Ichi Nakao (Department of Chemical System Engineering, University of Tokyo) and Kazuaki Nakagawa (Toshiba R&D Centre)) discloses the preparation of lithium zirconates using a sol-gel method from alkoxides in organic solvents. The paper compares this process with a powder method involving the wet mixing of magnesium-stabilised tetragonal zirconia with lithium and potassium carbonates, the ratio of Zr:Li:K being 1:1.1:0.2, followed by drying and then calcining at 700° C. or 900° C.

WO 03/020283 by Valence Technology Inc describes preparation methods for the production of materials with the composition $Li_nM'_aM''_{1-a}Ti_bZr_{1-b}O_4$ (where n=0.01-1, a=0-1, b=0-1, M'=one or more of V, Mn, Ti, Fe, Cr, Ni, Co and Mo, and M''=one or more of Al, B, In, Ga, Tl, Bi and At) for use in rechargeable batteries. The described method requires the use of reducing carbon and is a dry or non-aqueous process.

A new process for the preparation of lithium zirconates has now been found which uses zirconium hydroxide instead of zirconia as the starting material. This method uses lower calcination temperatures than in the prior art and allows the production of lithium zirconates having higher surface areas and pore volumes of up to four times those which have previously been reported. Thus, materials can be produced that take up carbon dioxide at faster rates and in larger amounts than has previously been possible.

The process of the present invention involves the wet mixing of zirconium hydroxide, which may be doped or undoped, with lithium carbonate, followed by calcination. The reaction utilised in the present invention can take place in an aqueous medium, preferably water, or a non-aqueous medium. The zirconates formed by the process of this invention are inherently all of the type $Li_2ZrO_3$ and therefore fall in the class $Li_nM'_{2-n}Zr_{1-2n}O_3$ (where n=0.01-2, and M'=one or more of Al, Na, Si, K, Mg and Y) and therefore fall outside the range of materials described in the Valence patent publication.

The preferred dopants are potassium oxide, magnesium oxide, sodium oxide, lithium oxide, yttria, alumina and silica. When present in the zirconium hydroxide, the dopants are in their hydroxide form.

When a doped material is desired, as an alternative to the addition of the dopants to the zirconium hydroxide before mixing, the required dopants may be added as their carbonate salts to the reaction mixture. Other salt forms may be used provided that they can be pyrolised to form the corresponding oxide, e.g. nitrate or oxalate. Preferably the wet mixture is stirred and then the mixture is calcined to form the desired zirconate. Drying of the wet mixture may optionally take place before the mixture is calcined. Milling of the mixture before or after calcination can also be performed if desired.

The calcination temperatures used are preferably greater than or equal to 700° C., more preferably greater than or equal to 775° C. They need not be as high as the prior art, such as 800° C. or 900° C.

By using the process of the present invention the mean pore diameters of the zirconates formed can be less than 75 nm and/or their surface areas can be at least 0.49 $m^2/g$ and/or their total pore volumes can be at least 0.002 $cm^3/g$. These preferred material properties especially when combined, such as total pore volume and mean pore diameter, are believed to be unachievable by prior art production methods. It has been found that the carbon dioxide uptake of the zirconates formed by the present process can be at least 53% of theoretical and that these zirconates are capable of absorbing up to 4.85 mol/kg of carbon dioxide.

It has also surprisingly been found that the lithium zirconates produced by the present process have an unexpected ability for absorbing carbon dioxide at relatively low temperatures, even down to room temperature. In order to obtain maximum capacity for carbon dioxide absorption it may therefore be necessary to activate the zirconates prior to use to remove any pre-absorbed carbon dioxide, thus regenerating the material. Alternatively the zirconates can be stored after initial calcination in an environment free of carbon dioxide, e.g. packaged under an inert gas such as nitrogen.

The invention is further illustrated by the following Examples:

EXAMPLE 1

Magnesium Oxide Doped Lithium Zirconate Calcined at 700° C.

415.1 g of magnesium hydroxide doped zirconium hydroxide having a d50 of ~15 μm, containing the equivalent of 183.5 g total oxides (96.6 wt % zirconium oxide and 3.4 wt % magnesium oxide), was slurried in deionised water to bring the total weight up to 615.1 g. 110.3 g of lithium carbonate was then slowly added and the resultant mixture was stirred for 2 hours. The mixture was then calcined at 700° C. to yield 261.2 g of lithium zirconate containing 2.3 wt % MgO.

EXAMPLE 2

Alumina, Yttria and Potassium Oxide Doped Lithium Zirconate 478.4 g of yttrium hydroxide and aluminium hydroxide doped zirconium hydroxide having a d50 of ~15 μm, containing the equivalent of 155.0 g of total oxides (94.45 wt % zirconium oxide, 0.25 wt % alumina and 5.3 wt % yttria), was slurried in deionised water to bring the total weight up to 678.4 g. 59.5 g of lithium carbonate was then slowly added, followed by the slow addition of 16.35 g of potassium carbonate, and the resultant mixture was stirred for 30 minutes. The mixture was then calcined at 775° C. to yield 210.7 g of lithium zirconate containing 3.4 wt % yttria, 0.2 wt % alumina and 5.1 wt % potassium oxide.

EXAMPLE 3

Yttria and Potassium Oxide Doped Lithium Zirconate from Zirconium Hydroxide Having d50 of ~15 μm 154 g of yttrium hydroxide doped zirconium hydroxide having a d50 of ~15 μm, containing the equivalent of 75.0 g of total oxides (94.7 wt % zirconium oxide and 5.3 wt % yttria), was slurried in deionised water to bring the total weight up to 225 g. 42.9 g of lithium carbonate was then slowly added, followed by the slow addition of 8.0 g of potassium carbonate, and the resultant mixture was stirred for 30 minutes. The mixture was then calcined at 775° C. to yield 75 g of lithium zirconate containing 3.4 wt % yttria and 5.1 wt % potassium oxide.

EXAMPLE 4

Undoped Lithium Zirconate 211.2 g of zirconium hydroxide having a d50 of ~15 μm, containing the equivalent of 100.0 g of zirconium oxide, was slurried in deionised water to bring the total weight up to 361.2 g. 59.5 g of lithium carbonate was then slowly added, and the resultant mixture was stirred for 30 minutes. The mixture was then calcined at 775° C. to yield 96.7 g of undoped lithium zirconate.

EXAMPLE 5

Potassium Oxide Doped Lithium Zirconate 211.2 g of zirconium hydroxide having a d50 of ~15 μm, containing the equivalent of 100.0 g of zirconium oxide, was slurried in deionised water to bring the total weight up to 361.2 g. 59.5 g of lithium carbonate was then slowly added, followed by the slow addition of 11.1 g of potassium carbonate, and the resultant mixture was stirred for 30 minutes. The mixture was then calcined at 775° C. to yield 94.7 g of lithium zirconate containing 5.3 wt % potassium oxide.

EXAMPLE 6 (COMPARATIVE)

Commercial Lithium Zirconate

For comparison a sample of commercially available lithium zirconate (not produced by the process of present invention) was obtained and tested alongside lithium zirconates produced in accordance with the process of the present invention.

Table 1 summarises the properties and carbon dioxide absorption values for the lithium zirconates produced as described in the above Examples 1 to 5 and for the sample of Comparative Example 6.

The zirconates of Examples 1 to 5 were, however, not activated or stored in the absence of carbon dioxide prior to testing, and therefore they could have adsorbed some carbon dioxide from the atmosphere after their production. Thus higher carbon dioxide uptakes are likely to have been achieved if those zirconates prior to testing were to have been activated to remove any pre-adsorbed carbon dioxide.

TABLE 1

| Reference | Balance* | IGA** (Based on 1 kg reagent) | TGA*** (based on 1 kg reagent) | Surface area# ($m^2/g$) | Total pore volume# ($cm^3/g$) | Average pore size# (nm) |
|---|---|---|---|---|---|---|
| Example 1 | 13.90 wt % (53% theoretical) | 15.71 wt % uptake after 24 hours. ½ max capacity in 110 mins, and 90% in 14.64 hours. | ½ max capacity in 72 mins and 90% in 3.07hours max capacity 3.15 mol. | | | |
| Example 2 | 20.83 wt % (79% theoretical) | Max capacity 4.85 mol, ½ max capacity in 18.8 mins, (5.67 g$CO_2$/min) 90% of max in less than 2.5 hours. (1.28 g$CO_2$/min) 21.21 wt % after 24 hours in $CO_2$ flow. See FIG. 2, FIG. 3 and FIG. 4. | Also ran TGA at various temperatures. 21.3 wt % uptake at 490° C., 16.9 wt % at 260° C. and 26.7 wt % at room temperature. | 2.99 | 0.006 | 9.6 |
| Example 3 | | Max capacity 3.3 mol. ½ capacity in 45 mins (1.61 g$CO_2$/min) and 90% in 7 hours (0.3 g$CO_2$/min). See FIG. 4. | Max capacity 3.2 mol. ½ max capacity in 55 mins and 90% max in 5 hours. | 0.49 | 0.003 | 25.7 |
| Example 4 | 15.25 wt % (58% theoretical) | | Max capacity 3.23 mol (14.24 wt %) | 0.59 | 0.002 | 15.8 |
| Example 5 | 24.06 wt % (91% theoretical) | | | 1.48 | 0.008 | 21.5 |
| Example 6 (Comparative) | | | | 0.48 | 0.001 | 10.7 |

Notes on Table 1
*Measurement of $CO_2$ uptake was performed at 500° C. using a gravimetric flow technique. The samples were placed in ceramic crucibles, brought to constant weight at 500° C. under atmospheric pressure and then exposed to a flow of pure $CO_2$ for 24 hours. The sample weights were measured using a Sartorius microbalance with an accuracy of ±50 µg.
**Measurement of kinetics was done using an IGA (Isothermal gravimetric analysis) with a sample temperature of 490° C., using a flow of pure $CO_2$. Pressure steps from 0 to 500 mbar and from 500 to 950 mbar were used.
***Measurements were also carried out using a TGA (thermal gravimetric analysis) method, again using a pure $CO_2$ stream at 500° C. after first purging the sample with nitrogen.
Measured using a TriStar 3000.

The invention is further described by reference to the attached set of Figures, in which.

Figure 1:
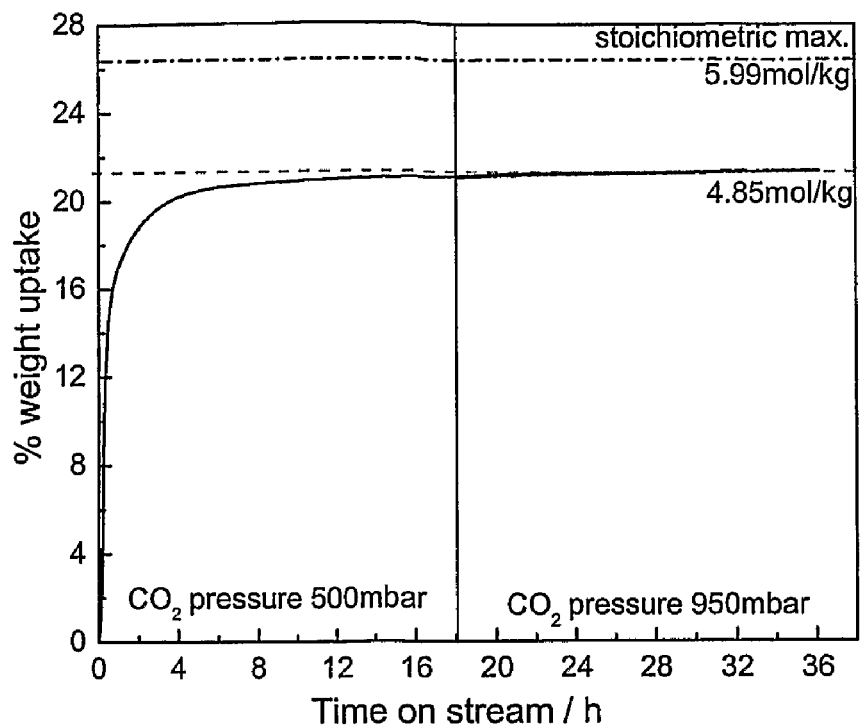
FIG. 1 shows the overall rate for, and the total of, the carbon dioxide uptake of a sample of the lithium zirconate doped with alumina, yttria and potassium oxide of Example 2.
Figure 2:
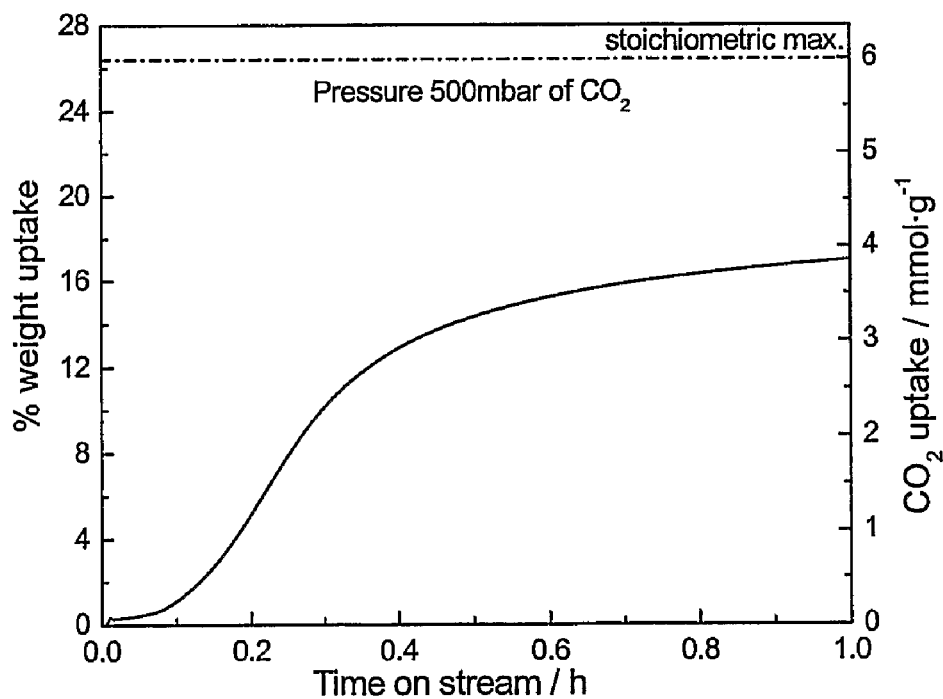
FIG. 2 shows the initial rate of carbon dioxide uptake of a sample of the lithium zirconate doped with alumina, yttria and potassium oxide of Example 2.
Figure 3:
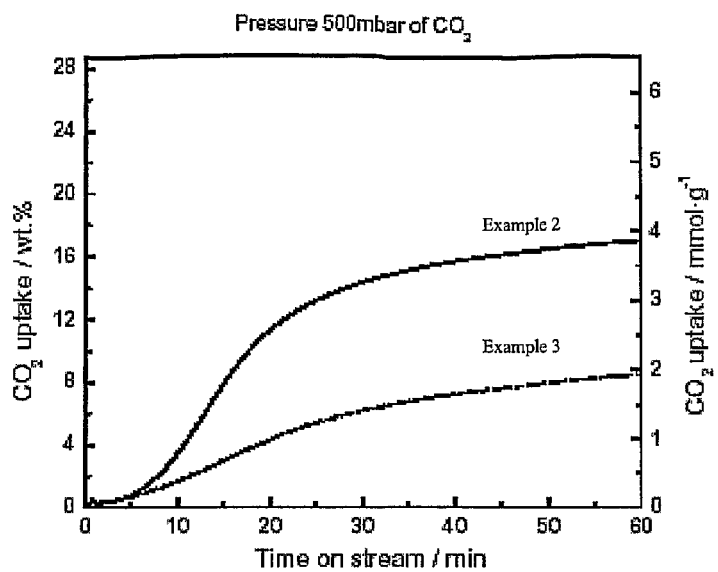
FIG. 3 shows the improved rate of carbon dioxide uptake of a sample of the lithium zirconate doped with alumina, yttria and potassium oxide of Example 2 when compared with that for a sample of the lithium zirconate doped with only potassium oxide of Example 3.
Figure 4:
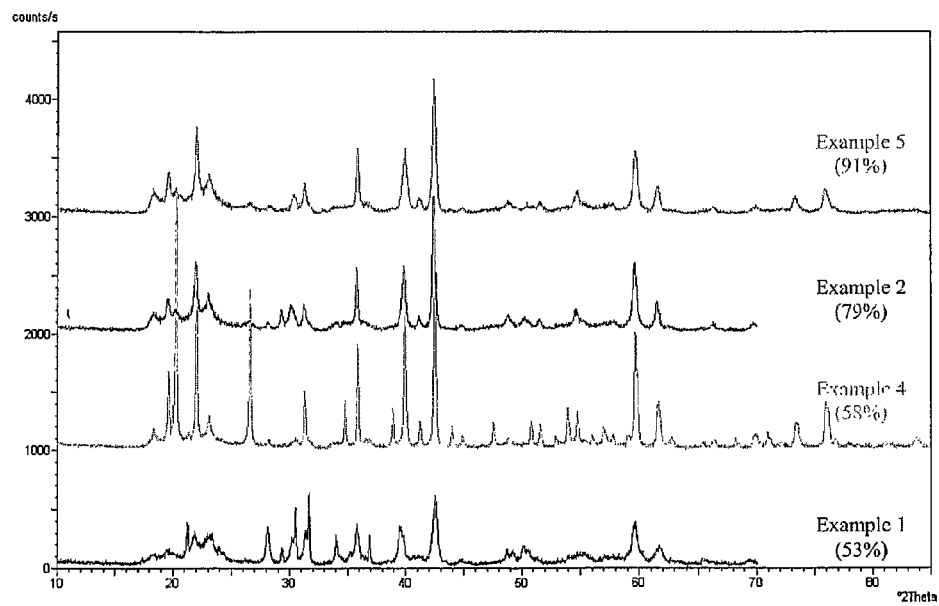

FIG. 4 shows XRD spectra of samples of the lithium zirconates formed in Examples 5, 2, 4 and 1. The peaks at 20 and 22 are for monoclinic lithium zirconate, the peaks at 23, 36 and 49 are for tetragonal lithium zirconate and the peaks at 28, 30, and 32 are for phases of zirconium. By comparing these traces with the results set out in Table 1 it is clear that crystal form is not the most important factor affecting the carbon dioxide uptake of the lithium zirconates produced by the process of the present invention.

Figure 5:
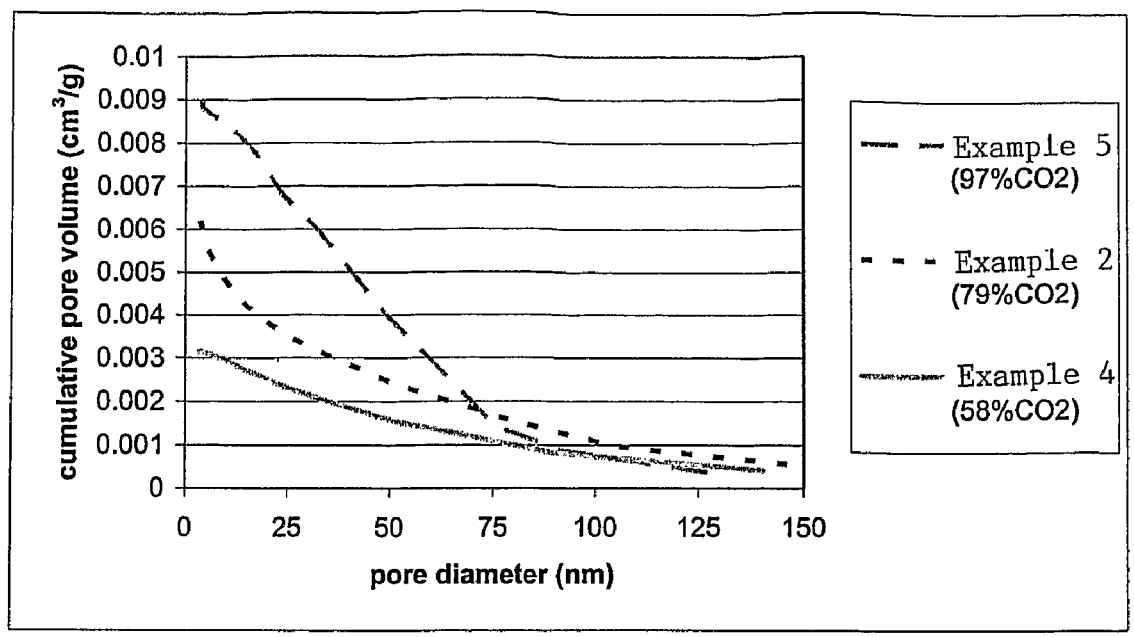

FIG. 5 shows cumulative pore volumes for samples of the lithium zirconates of Example 5, Example 2 and Example 4 at 500° C. This Figure shows that carbon dioxide uptake is higher for the zirconate having a greater total pore volume.

The invention claimed is:

1. A process for the production of lithium zirconate comprising the steps of:
    wet mixing zirconium hydroxide with lithium carbonate, and
    calcining the mixture to form undoped said lithium zirconate having a formula, $Li_2ZrO_3$, or doped said lithium zirconate having a formula, $Li_nM'_{2-n}Zr_{1-2n}O_3$, where n is at least 0.01 and M' is one or more of Al, Na, Si, K, Mg and Y, and said doped and undoped lithium zirconate is in at least one of a tetragonal or monoclinic phase.

2. A process as claimed in claim 1 wherein the wet mixing is effected in an aqueous medium.

3. A process as claimed in claim 1 wherein the zirconium hydroxide is doped with a hydroxide of one or more of potassium, magnesium, sodium, lithium, yttrium, aluminum and silicon before being mixed with said lithium carbonate.

4. A process as claimed in claim 1 wherein one or more of potassium, magnesium, sodium, lithium, yttrium, aluminum and silicon salts are added during the mixing of zirconium hydroxide and lithium carbonate, the salts being capable of undergoing pyrolysis to form their corresponding oxides.

5. A process as claimed in claim 4 wherein the salts are carbonate salts.

6. A process as claimed in claim 1 wherein the calcination temperature is at least 700° C. but less than 800° C.

7. A process as claimed in claim 6 wherein the calcination temperature is at least 775° C., but less than 800° C.

8. A process as claimed in claim 1 wherein conditions of said calcining produce said doped or undoped lithium zirconate having a total pore volume of at least 0.002 $cm^3/g$.

9. A process as claimed in claim 8 wherein said conditions of said calcining produce said doped or undoped lithium zirconate capable of absorbing 4.85 mol/kg of carbon dioxide.

10. A process as claimed in claim 8 wherein said conditions of said calcining produce said doped or undoped lithium zirconate having a surface area of at least 0.49 $m^2/g$.

11. A process as claimed in claim 8 wherein said conditions of said calcining produce said doped or undoped lithium zirconate having a mean pore diameter of less than 75 nm.

12. A process as claimed in claim 1 comprising drying the mixture prior to said calcining.

* * * * *